US012702943B2

(12) United States Patent
Krauth et al.

(10) Patent No.: US 12,702,943 B2
(45) Date of Patent: Aug. 11, 2026

(54) MID-PRESSURE WATER SEPARATION FOR ENVIRONMENTAL CONTROL SYSTEM

(71) Applicant: Hamilton Sundstrand Corporation, Charlotte, NC (US)

(72) Inventors: Kayla Krauth, Weatogue, CT (US); Louis J. Bruno, Ellington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 377 days.

(21) Appl. No.: 18/430,859

(22) Filed: Feb. 2, 2024

(65) Prior Publication Data

US 2025/0249388 A1 Aug. 7, 2025

(51) Int. Cl.
*B01D 45/16* (2006.01)
*B64D 13/06* (2006.01)

(52) U.S. Cl.
CPC ............. *B01D 45/16* (2013.01); *B64D 13/06* (2013.01); *B64D 2013/0674* (2013.01)

(58) Field of Classification Search
CPC .................... B01D 45/16; B64D 13/06; B64D 2013/0674; B04C 3/06; B04C 2003/006
See application file for complete search history.

(56) References Cited

U.S. PATENT DOCUMENTS 2,967,618 A * 1/1961 Vane ........................ D21D 5/18 210/801
3,258,895 A * 7/1966 Wiebe ....................... B04C 3/00 55/438
3,581,477 A * 6/1971 Bell ....................... B01D 45/16 55/347
3,643,800 A * 2/1972 Mansson ................... B04C 3/06 209/148
4,179,273 A * 12/1979 Montusi ............... B01D 21/265 210/512.1
4,229,194 A * 10/1980 Baillie .................. B01J 8/0055 55/435

(Continued)

FOREIGN PATENT DOCUMENTS

CN 105597472 A * 5/2016 ............ B01D 50/20
CN 205360938 U * 7/2016

(Continued)

OTHER PUBLICATIONS

Search Report issued in European Patent Application No. 25155597.5; Date of Mailing Apr. 8, 2025 (8 pages).

(Continued)

*Primary Examiner* — Stephen Hobson
(74) *Attorney, Agent, or Firm* — CANTOR COLBURN LLP

(57) ABSTRACT

A water separator for use in an environmental control system of an aircraft includes an outer housing having an upstream end, a downstream end, and a longitudinal axis. A vane assembly is arranged within the outer housing and is spaced about the longitudinal axis. The vane assembly defines a plurality of flow channels. At least one flow channel of the plurality of flow channels is located radially outward of another flow channel of the plurality of flow channels. The plurality of flow channels have a spiral-like configuration about the longitudinal axis and a flow length of the plurality of flow channels is equal.

19 Claims, 4 Drawing Sheets

(56) References Cited

U.S. PATENT DOCUMENTS 4,371,382 A * 2/1983 Ross .................... B01D 47/085 95/220
4,681,610 A * 7/1987 Warner .................. B01D 45/12 55/394
5,378,265 A * 1/1995 Pearl ...................... B01D 47/18 95/219
5,531,811 A * 7/1996 Kloberdanz ........... B01D 45/12 96/216
5,622,621 A * 4/1997 Kramer ............. B01D 17/0217 210/512.3
6,331,195 B1 * 12/2001 Faust ..................... B01D 45/16 96/191
6,776,825 B2 * 8/2004 Betting .................. B01D 51/08 95/32
7,691,185 B2 * 4/2010 Darke ....................... B04C 3/06 55/428
7,837,752 B2 * 11/2010 Darke .................... B01D 50/20 95/268
8,012,229 B1 * 9/2011 Saaski .................. G01N 1/2211 55/423
8,434,700 B2 * 5/2013 Guo ......................... B01J 4/002 239/501
9,764,252 B2 * 9/2017 Whitney ................ B01D 17/06
9,916,909 B2 * 3/2018 Mistreanu ............. F22B 37/268
11,339,686 B2 * 5/2022 Fujita ...................... F22B 37/26
11,731,885 B2 * 8/2023 Turton ............... B01D 19/0057 210/188
12,311,300 B2 * 5/2025 Mangoyan .............. F25B 43/00
2002/0038760 A1 * 4/2002 Salmisuo ............... B01D 45/16 202/160
2010/0275561 A1 * 11/2010 Lundquist ................. B04C 3/06 524/570
2011/0078987 A1 * 4/2011 Shishov ................. B01D 46/14 55/432
2011/0281716 A1 * 11/2011 Hurd ....................... C22C 29/08 416/224
2012/0103423 A1 * 5/2012 Schook ..................... B04C 3/00 137/1
2013/0333566 A1 * 12/2013 Lardy ....................... B04B 1/06 96/216
2014/0298761 A1 * 10/2014 Ackermann .............. B04C 3/06 55/457
2015/0014258 A1 * 1/2015 Whitney ................ B01D 17/06 210/512.3
2015/0273483 A1 * 10/2015 Krishnamurthy ...... B01D 45/12 55/346
2015/0306528 A1 * 10/2015 Mueller .................... B04C 3/06 55/338
2018/0133634 A1 * 5/2018 Zager ...................... F25B 9/004
2019/0126180 A1 * 5/2019 Devereux .............. B01D 45/08
2019/0299135 A1 * 10/2019 Gerlach ................. B64D 13/00
2021/0138378 A1 * 5/2021 Hoang ...................... B04C 3/06
2022/0169393 A1 * 6/2022 Bruno .................... B64D 13/06
2023/0077365 A1 * 3/2023 Ho ......................... B01D 46/10 62/87
2023/0191295 A1 * 6/2023 McCord ................. B64D 13/06 95/271
2024/0042360 A1 * 2/2024 Mangoyan .............. F25B 9/004
2025/0236397 A1 * 7/2025 Colson ................... B01D 45/06
2025/0249379 A1 * 8/2025 Krauth ................... B01D 45/16
2025/0249388 A1 * 8/2025 Krauth ................... B01D 45/16
2026/0053316 A1 * 2/2026 Li ......................... A47L 9/1608

FOREIGN PATENT DOCUMENTS

CN 105854425 A * 8/2016 ............. B01D 45/08
CN 205435993 U * 8/2016
CN 111111328 A * 5/2020 ............. B01D 45/16
CN 108474385 B * 5/2021 ........... F04D 29/263
EP 4316988 A1 2/2024
WO WO-9806480 A1 * 2/1998 .............. B01J 35/56
WO WO-2011070818 A1 * 6/2011 ........... B01D 29/263
WO WO-2019025617 A1 * 2/2019 ............... B04C 3/06

OTHER PUBLICATIONS

EP Communication pursuant to Article 94(3) EPC corresponding to EP Application No. 25 155 597.5; Issue date, Apr. 9, 2026, 4 pages.

* cited by examiner

MID-PRESSURE WATER SEPARATION FOR ENVIRONMENTAL CONTROL SYSTEM

BACKGROUND

Embodiments of the present disclosure relate to environmental control systems for a vehicle, and more particularly, to a water separator suitable for use in an environmental control system of an aircraft.

In existing environmental control systems, an air flow is typically cooled within a heat exchanger then provided to a water collector located downstream from the heat exchanger to capture or remove any free moisture from the airflow. The water collector typically includes a separation device that directs the moisture present within the airflow to outer walls of the separation device and directs the free moisture towards a drain port. Often times the heat exchanger and the water collector are substantially bulky and consume large amounts of space.

BRIEF DESCRIPTION

According to an embodiment, a water separator for use in an environmental control system of an aircraft includes an outer housing having an upstream end, a downstream end, and a longitudinal axis. A vane assembly is arranged within the outer housing and is spaced about the longitudinal axis. The vane assembly defines a plurality of flow channels. At least one flow channel of the plurality of flow channels is located radially outward of another flow channel of the plurality of flow channels. The plurality of flow channels have a spiral-like configuration about the longitudinal axis and a flow length of the plurality of flow channels is equal.

In addition to one or more of the features described above, or as an alternative to any of the foregoing embodiments each of the plurality of flow channels has a constant area over an axial length of the outer housing.

In addition to one or more of the features described above, or as an alternative to any of the foregoing embodiments a cross-sectional area of at least one of the plurality of flow channels varies relative to the cross-sectional area of another of the plurality of flow channels.

In addition to one or more of the features described above, or as an alternative to any of the foregoing embodiments a twist angle of at least one of the plurality of flow channels is different than the twist angle of another of the plurality of flow channels.

In addition to one or more of the features described above, or as an alternative to any of the foregoing embodiments the another flow channel has a first twist angle and the at least one flow channel located radially outward of the another flow channel has a second twist angle. The second twist angle is less than the first twist angle.

In addition to one or more of the features described above, or as an alternative to any of the foregoing embodiments the vane assembly includes at least one ring vane extending parallel to the longitudinal axis.

In addition to one or more of the features described above, or as an alternative to any of the foregoing embodiments the at least one ring vane includes a plurality of ring vanes and an origin of each of the plurality of ring vanes is arranged at the longitudinal axis.

In addition to one or more of the features described above, or as an alternative to any of the foregoing embodiments the plurality of ring vanes are equidistantly spaced within the outer housing.

In addition to one or more of the features described above, or as an alternative to any of the foregoing embodiments the vane assembly includes at least one radial vane.

In addition to one or more of the features described above, or as an alternative to any of the foregoing embodiments the at least one radial vane is arranged between at least one pair of adjacent ring vanes of the plurality of ring vanes.

In addition to one or more of the features described above, or as an alternative to any of the foregoing embodiments the at least one radial vane is integrally formed with at least one of the plurality of ring vanes.

In addition to one or more of the features described above, or as an alternative to any of the foregoing embodiments a total number of radial vanes arranged between a first pair of adjacent ring vanes is equal to the total number of radial vanes arranged between a second pair of adjacent ring vanes.

In addition to one or more of the features described above, or as an alternative to any of the foregoing embodiments a total number of radial vanes arranged between a first pair of adjacent ring vanes is different from the total number of radial vanes arranged between a second pair of adjacent ring vanes.

In addition to one or more of the features described above, or as an alternative to any of the foregoing embodiments a center body is arranged within the outer housing and is aligned with the longitudinal axis. At least one ring vane is arranged between the center body and the outer housing.

In addition to one or more of the features described above, or as an alternative to any of the foregoing embodiments at least one radial vane is arranged at the center body.

In addition to one or more of the features described above, or as an alternative to any of the foregoing embodiments a direction of twist of the spiral-like configuration about the longitudinal axis and a direction of a spin of a flow of medium provided to the upstream end of the outer housing is the same.

In addition to one or more of the features described above, or as an alternative to any of the foregoing embodiments a direction of twist of the spiral-like configuration about the longitudinal axis and a direction of a spin of a flow of medium provided to the upstream end of the outer housing is different.

In addition to one or more of the features described above, or as an alternative to any of the foregoing embodiments the water separator is removably mounted within the duct.

In addition to one or more of the features described above, or as an alternative to any of the foregoing embodiments the water separator is integrally formed with a duct.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
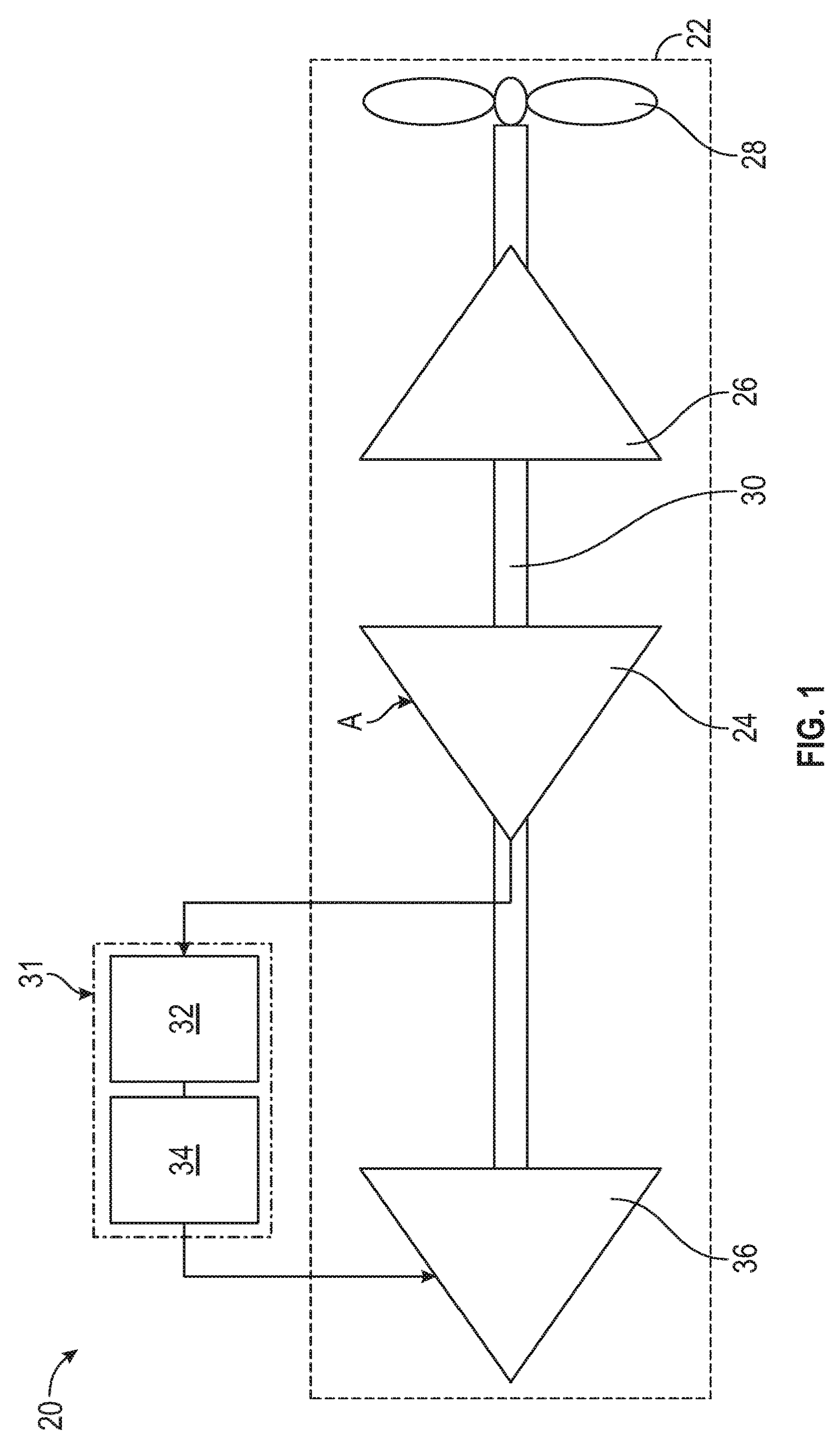
FIG. 1 is a schematic diagram of a portion of an environmental control system according to an embodiment.

With reference now to the FIG. 1, an exemplary portion of an environmental control system 20, such as part of a pack of an environmental control system for example, is illustrated. As shown, the environmental control system (ECS) 20 includes an air cycle machine 22 having a turbine 24, and in some embodiments includes one or more other components, such as a compressor 26 and a fan 28 operably coupled to the turbine 24 by a rotatable shaft 30 for example. In an embodiment, the same flow of medium is provided to the compressor 26 and the turbine 24 in series. Accordingly, the medium may be at its highest pressure when output from the compressor 26 until reaching the inlet of the turbine 24 and may be a medium or mid-pressure when output from the outlet of the turbine 24.

In the illustrated, non-limiting embodiment, a water extractor 31 is arranged directly downstream from the outlet of the turbine 24, such as when the medium is at a middle pressure. As shown, the water extractor 31 may include a water separator 32 and a water collector 34 arranged in series relative to a flow of medium, with the water collector being arranged downstream form the water separator 32. The water separator 32 may be used to remove moisture, such as water for example, from the medium and the water collector 34 is operable to collect the removed moisture such that the medium output from the water collector 34 is drier than the medium provided to the water separator 32. Although the water separator 32 and the water collector 34 are schematically illustrated as separate components, it should be appreciated that embodiments where the two are integrally formed are within the scope of the disclosure. In the illustrated, non-limiting embodiment, the cool, dry medium output from the water collector 34 is provided to a second turbine 36. Although the second turbine 36 is illustrated as being arranged directly downstream from the water collector 34, it should be appreciated that in other embodiments, one or more additional components may be arranged between the outlet of the water collector 34 and the second turbine 36. Further, although the turbine 36 is illustrated as being part of the air cycle machine 22, embodiments where the turbine 36 is separate from the air cycle machine 22 are also within the scope of the disclosure.

It should be appreciated that the configuration of a portion of the environmental control system 20 described herein is intended as an example only and that an environmental control system having any suitable configuration is within the scope of the disclosure. Further, it should be understood that embodiments where the water separator 32 and water collector 34, in combination, are arranged downstream from any suitable component of the ECS 20 are also contemplated herein. In an embodiment, the water separator 32 is positioned within the ECS 20 to receive a flow of medium, such as a fluid or air A for example, that is cool and has condensed water vapor entrained or suspended therein resulting in a fog-like consistency.

Figure 2:
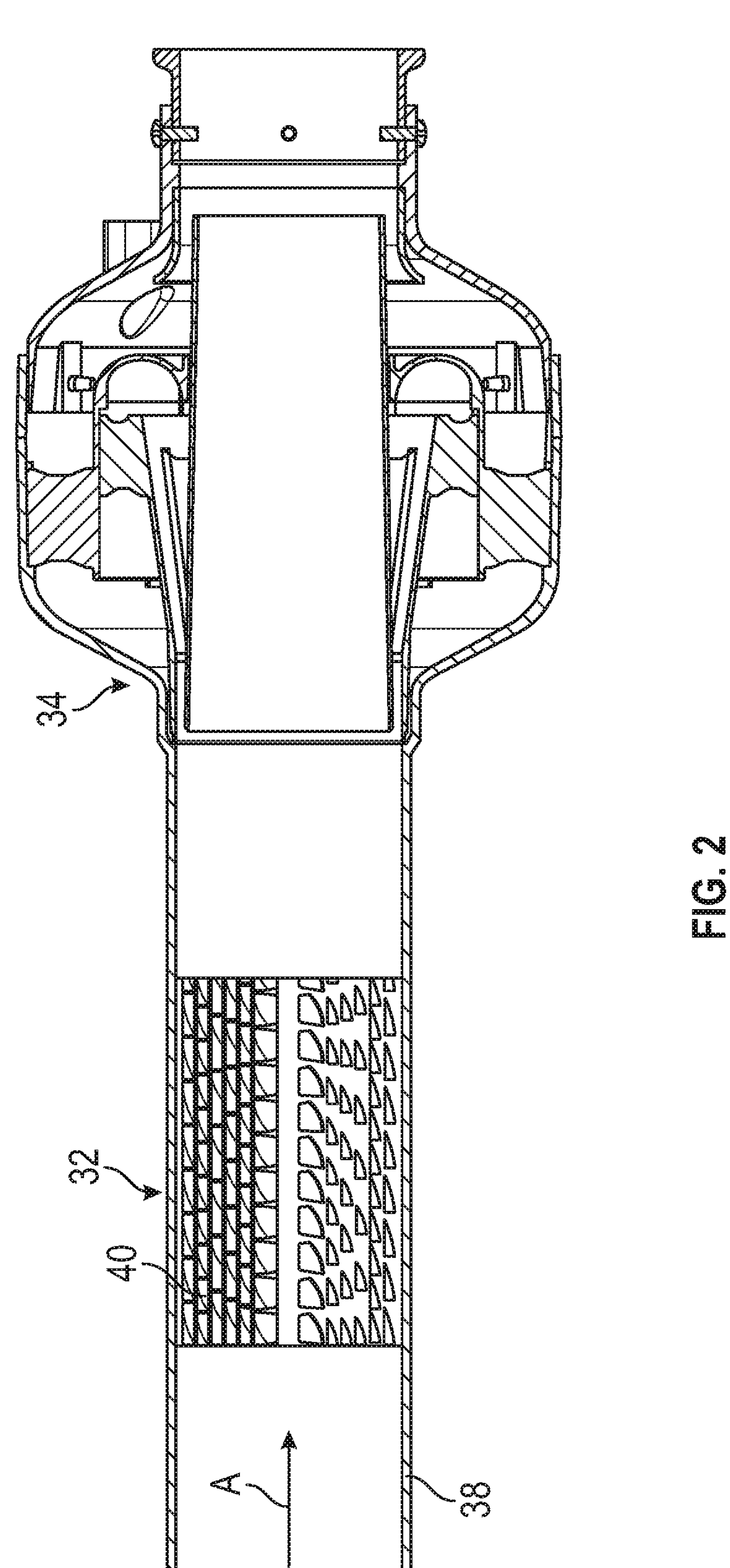
FIG. 2 is a perspective view of a water extractor according to an embodiment.

With reference now to FIG. 2, an example of water extractor 31 suitable for use in an ECS 20 is illustrated in more detail. In the illustrated, non-limiting embodiment, the water separator 32 includes an insert 40 positionable within a duct or conduit 38 connected to a component of an environmental control system. The insert 40 may be arranged within the duct 38 at any suitable location, such as downstream from an outlet of the turbine 24 and upstream from the inlet of the water collector 34. In embodiments where the water separator 32 includes an insert, the insert 40 may be permanently or removably mountable within the interior of the duct 38, and/or to a portion of the turbine 24. Alternatively, the insert 40 may be integrally formed with the duct 38 or the outlet of the turbine 24, such as via an additive manufacturing process for example. It should be appreciated that in some embodiments, the insert 40 is the water separator 32.

Figure 3:
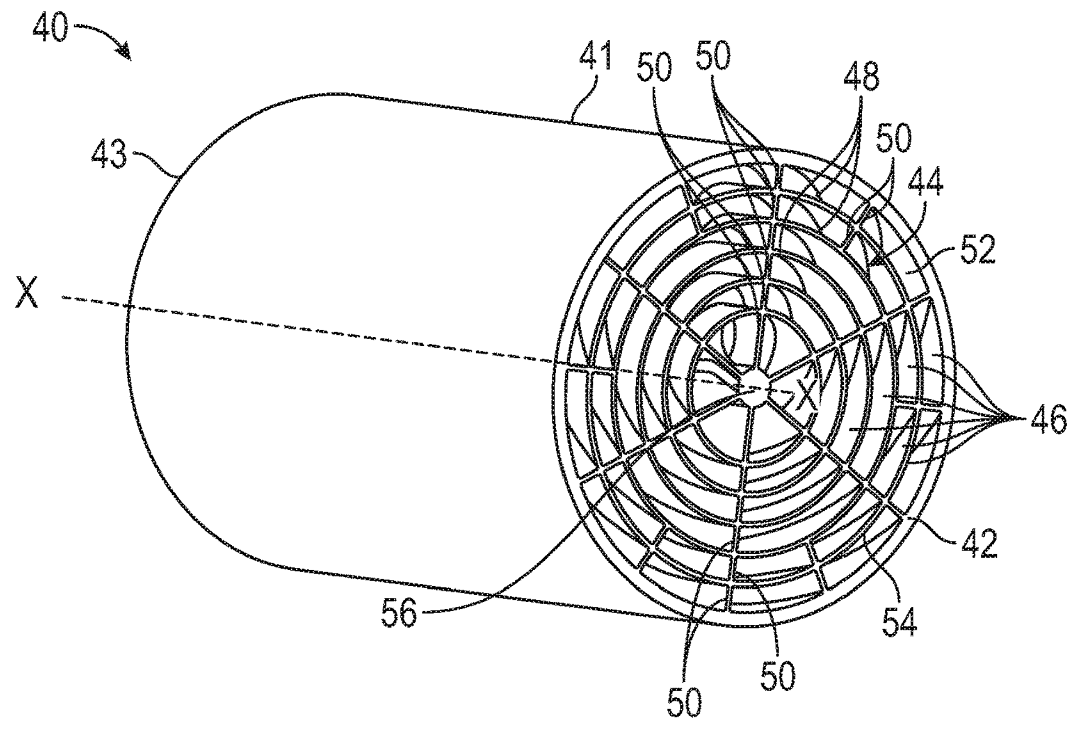
FIG. 3 is a front perspective view of a water extractor according to an embodiment.
Figure 4:
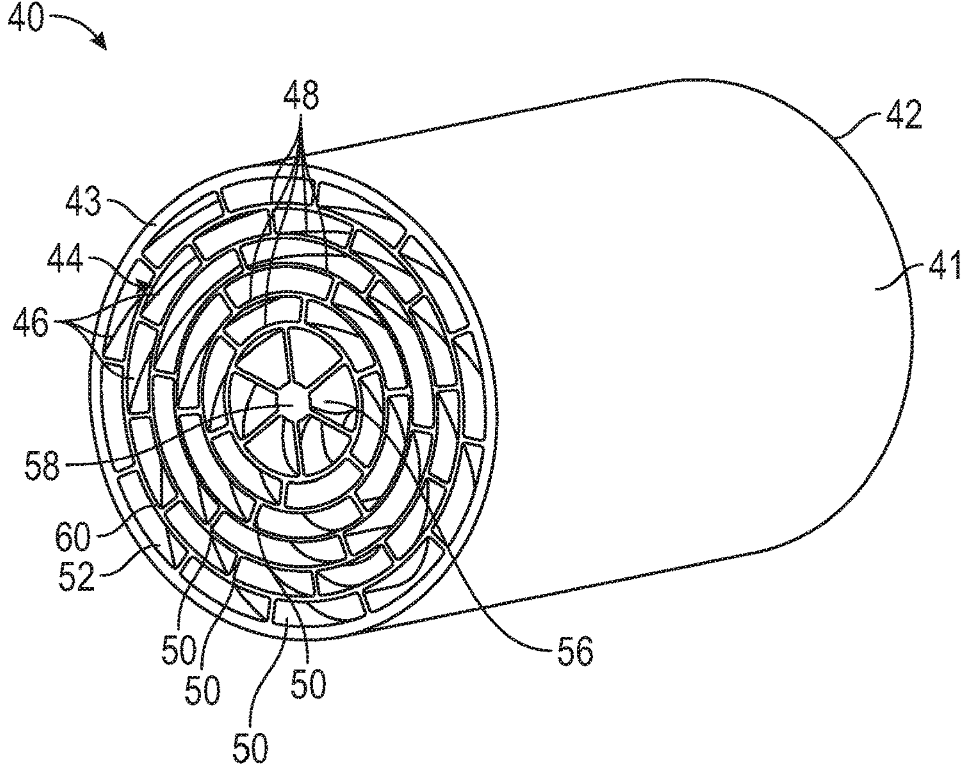
FIG. 4 is a rear perspective view of the water extractor of FIG. 3 according to an embodiment.
Figure 5:
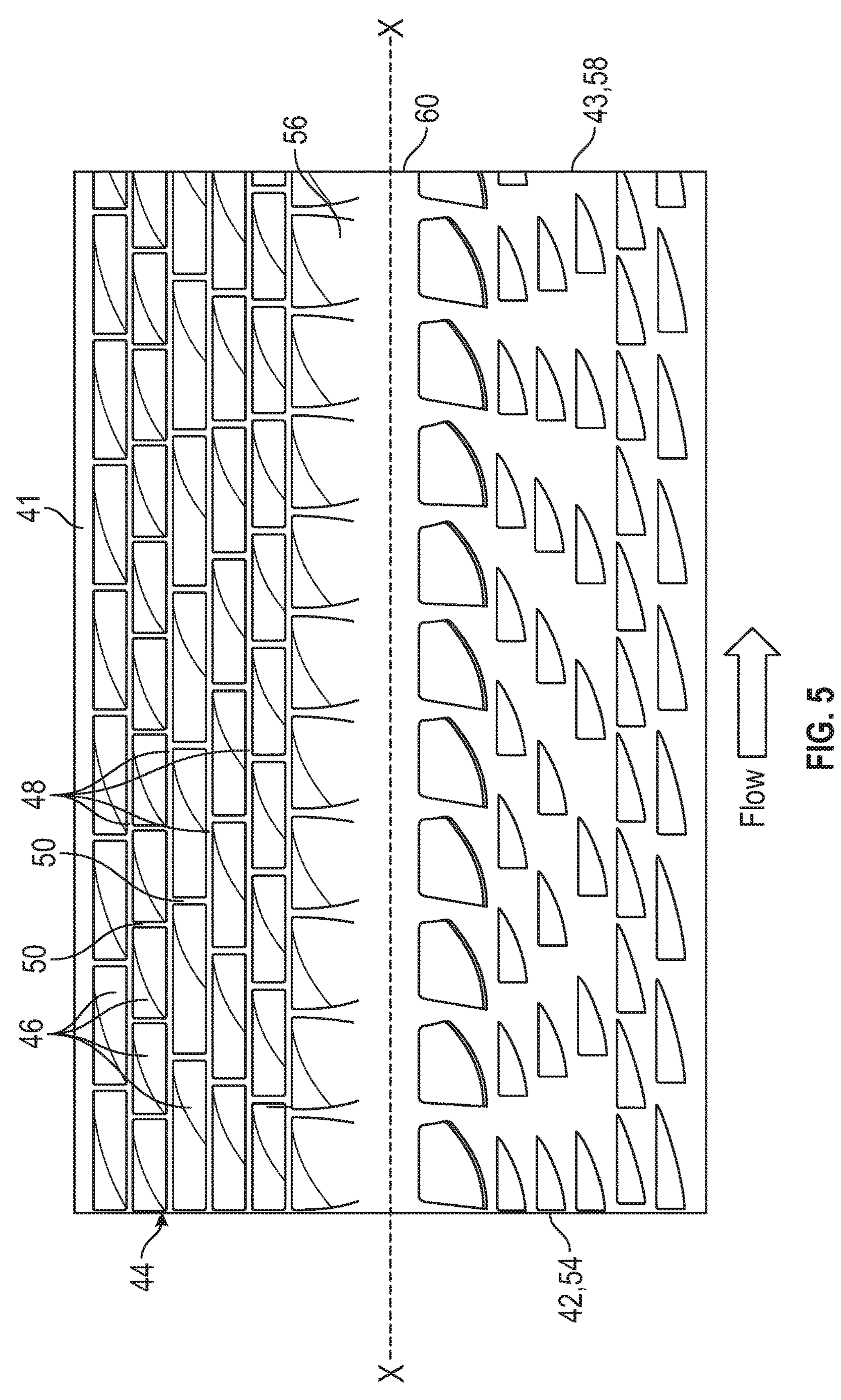
FIG. 5 is a cross-sectional view of the water extractor of FIG. 3 taken along the central longitudinal according to an embodiment.

An exemplary insert 40 of a water separator 32 is illustrated in more detail in FIGS. 3-5. As shown, the insert 40 has a body including an outer housing 41. Although the outer housing 41 is illustrated as being cylindrical in shape, it should be understood that embodiments where a cross-section of the outer housing 41 is a shape other than a circle, such as a square, rectangle, triangle, or other suitable shape are also contemplated herein. In an embodiment, the shape and size of at least a portion of the outer housing 41 is complementary to or substantially identical to the interior surface of the duct 38. For example, an outer diameter of the first upstream end 42 of the outer housing 41 may be substantially equal to the inner diameter of the duct 38 and/or an outer diameter of the second downstream end 43 of the outer housing 41 may be substantially equal to the inner diameter of the duct 38. Accordingly, when the insert 40 is arranged at an interior of the duct 38, a minimal amount of the medium, and in some embodiments, none of the medium, is configured to flow between the exterior of the insert 40 and the interior surface of the duct 38.

The insert 40 additionally includes an internal vane assembly 44 that defines a plurality of fluidly distinct flow channels 46 extending through the insert 40. As shown, the vane assembly 44 includes at least one ring vane 48, and in some embodiments, a plurality of ring vanes. In the illustrated, non-limiting embodiment, five ring vanes 48 are arranged between a center of the insert 40 and the outer housing 51 of the insert 40. However, it should be understood that embodiments having any suitable number of ring vanes 48, including two, three, four, or more than five ring vanes are within the scope of the disclosure.

Each of the ring vanes 48 is circular in shape (i.e., has a circular cross-section) and is positioned such that an origin or center of the ring vane 48 is arranged at the longitudinal axis X. Accordingly, in embodiments including multiple ring vanes 48, the ring vanes 48 are mounted concentrically with one another. In the illustrated, non-limiting embodiment, the radial distance between each pair of adjacent ring vanes 48 is generally equal. Said another way, the ring vanes 48 may be generally equidistantly spaced between a center of the insert 40 and the outer housing 41. However, embodiments where the radial distance between adjacent ring vanes 48 is non-uniform are also within the scope of the disclosure.

The ring vanes 48 are configured to extend axially over at least a portion of the axial length of the insert 40. The axial length of one or more of the plurality of ring vanes 48 may be substantially identical. In other embodiments, the axial length of one or more of the ring vanes 48 may vary.

The vane assembly 44 may further include at least one radial vane 50 configured to connect to the at least one ring vane 48. The radial vanes 50 may but need not be integrally formed with the at least one ring vane 48. In an embodiment, the vane assembly 44 includes a plurality of radial vanes 50. Although the radial vanes 50 defined between each pair of ring vanes 48 are illustrated as being substantially equidistantly spaced about the longitudinal axis X, embodiments where the radial vanes 50 are not equidistantly spaced about the longitudinal axis are also within the scope of the disclosure. In the illustrated, non-limiting embodiment, the vane assembly 44 includes at least one radial vane 50 extending between each adjacent pair of ring vanes 48, and between the outermost ring vane 48 and the interior surface 52 of the outer housing 41. In some embodiments, a plurality of radial vanes 50 are arranged between the same pair of ring vanes 48 or between the outermost ring vane 48 and the interior surface 52 of the outer housing 41. The total number of radial vanes 50 arranged between each pair of ring vanes 48 and between the outermost ring vane 48 and the outer housing 41 may be substantially identical or may vary. For example, twelve radial vanes 50 may be arranged the outermost ring vane 48 and the outer housing 41 and only six radial vanes 50 may be arranged a pair of adjacent ring vanes 48. It should be understood that embodiments of the vane assembly 44 having any number of radial vanes 50 are also contemplated herein.

In some embodiments, as shown in FIG. 3, at the first, inlet end 54 of the vane assembly 44, at least some of the radial vanes 50 arranged between adjacent pairs of ring vanes 48 are aligned along the radius of the insert 40. As shown, radial vanes 50 may be aligned over the entire radius of the insert 40. For example, a radial vane 50 positioned between a first pair of adjacent ring vanes 48 is aligned with a radial vane 50 positioned between a second pair of adjacent ring vanes 48, and a radial vane 50 positioned between a third pair of adjacent ring vanes 48, and a radial vane 50 positioned between a fourth pair of adjacent ring vanes 48 and a radial vane 50 positioned between the outermost ring vane 48 and the interior surface 52 of the outer housing 51. However, embodiments where the some of the radial vanes 50 are aligned over only a portion of the radius, and embodiments where none of the radial vanes 50 are aligned over even a portion of the radius of the insert 40 are also contemplated herein.

In the illustrated, non-limiting embodiment, a center body 56 is arranged coaxially with the longitudinal axis X. In such embodiments, radial vanes may extend between the center body 56 and an adjacent ring vanes 48. An end of such radial vanes 50 may be configured to contact, and in some embodiments, may be integrally formed with, an outer periphery of the center body 56. The center body 56 may extend over the entire axial length of the outer housing 41 or over only a portion thereof. In an embodiment, as shown in FIG. 3, the center body 56 may have a generally cylindrical shape. While the outlet end 58 of the center body 56 is illustrated as having a substantially planar end, in other embodiments, the outlet end 58 of the center body 56 may have another shape, such as a tapered or conical shape for example. In other embodiments, the insert 40 may not include a center body 56. In such embodiments, radial vanes 50 may or may not extend radially inwardly from the ring vane 48 positioned closest to the central longitudinal axis X. Accordingly, a hollow channel is defined at the center of the outer housing 41 by the innermost ring vane 48 or by the plurality of radial vanes 50 that extend radially inwardly toward the longitudinal axis X from the innermost ring vane 48.

Each of the plurality of flow channels 46 may be defined between an adjacent pair of radial vanes 50, and one or more ring vanes 48, the center body 56, or the outer housing 41. In an embodiment, each of the plurality of flow channels 46 has a uniform or constant area over an axial length of the insert 40. However, embodiments where the area of a flow channel varies over the axial length is also contemplated herein. Further, each of the plurality of flow channels need not have a uniform area. For example, the cross-sectional area of some flow channels 46 may be greater or smaller than the cross-sectional area of other flow channels.

In an embodiment, as a medium passes through one or more of the flow channels 46 of the insert 40, a swirl is imparted to the medium. For example, at least one of the flow channels 46 is configured to rotate about the longitudinal axis X over the axial length of the insert 40. This rotation of one or more of the flow channels 46 may be achieved by gradually rotating one or more of the radial vanes 50 about a periphery of the longitudinal axis X over the length of the insert 40. At least one of the radial vanes 50, and therefore the at least one corresponding flow channel 46, may twist about the longitudinal axis X any suitable amount between the upstream or inlet end 54 of the vane assembly 44 and the downstream or outlet end 60 of the vane assembly 44.

The total twist or twist angle defined between an inlet of a flow channel 46 and an outlet of a corresponding flow channel 46 about the longitudinal axis X will depend on the twist rate of the radial vane 50 and the axial length of the insert 40. For example, the at least one flow channel 46 may have a twist angle of at least 90 degrees. Further, embodiments where at least one flow channel 46 has a twist angle greater than 90 degrees, such as up to 180 degrees, up to 270 degrees, up to 360 degrees, up to 720 degrees or more are also contemplated herein. Further, embodiments where the twist angle is greater than 0 and less than 90 degrees are also within the scope of the disclosure.

In an embodiment, a plurality of flow channels 46 defined by the vane assembly 44 is configured to twist about the longitudinal axis X of the insert 40. In such embodiments the plurality of flow channels 46 may be considered to twist uniformly about the axis X. However, in other embodiments, the rotation of the plurality of flow channels 46 about the longitudinal axis X may vary. For example, the rotation may vary such that a flow length of each of the plurality of flow channels 46 is substantially equal. Accordingly, the twist angle of a first flow channel about the longitudinal axis X may be different than the twist angle of a second flow channel about the longitudinal axis when the second flow channel is radially offset from the first flow channel. In an embodiment, each of the flow channels 46 at a given radial location are configured to twist uniformly about the longitudinal axis. For example, the radial vanes associated with each of the flow channels 46 defined between a pair of adjacent ring vanes 48, defined between the center body 56 and the innermost ring vane 48, or defined between the outermost ring vane 48 and the interior surface of the outer housing 41 rotate relative to the longitudinal axis in unison. However, the plurality of radial vanes 50 at an adjacent second radial location (either flow channels arranged at a shorter radius or a longer radius) may rotate relative to the longitudinal axis in unison but at a different rate than the first radial location. Accordingly, the first radial location may have a first twist angle and the second radial location may have a second twist angle, with the radially outward location having a lower twist angle.

The direction of twist or spiral-like configuration of the at least one flow channel 46 may be the same as the direction of the spin acting on the medium A output from the turbine 24, or alternatively, may be opposite the direction of the spin acting on the medium A output from the turbine 24.

In operation, as the flow of medium A output from a component, such as the turbine outlet of turbine 24 for example, passes through the plurality of flow channels 46 of the insert 40 in parallel, moisture within the flow of medium A will coalesce in the form of droplets on the surfaces of the flow channel 46, such as on the surfaces of the radial vanes 50, and/or the surfaces of the ring vanes 48 for example. During this coalescing, the flow of medium A will cause these droplets formed on the surface of the ring vanes 48 and the radial vanes 50 to move through the flow channels 46 and into the water collector 34 positioned directly downstream from the water separator 32. The water collector 34 may further separate a flow of medium A having water entrained therein from a central drier flow of medium as is known in the art.

A water separator 32 including a coalescing insert 40 as illustrated and described herein facilitates, and in some embodiments maximizes, the separation of water from a flow of medium A, such as an airflow for example, within a small sizing envelope. The insert 40 of the water separator 32 may be particularly useful for removing water from a flow of medium A when the water is in the form or a mist or fog, such as may be received from an outlet of a turbine. Further, by controlling the length of the passageways of each flow channel of the insert, equal distribution of the medium may be promoted while controlling the pressure drop through the insert. Further, by using the water separator 32 in an ECS 20 having two turbines 24, 36 arranged in series relative to the flow of medium A, the first turbine 24 may be configured to maintain the temperature of the medium A above freezing, whereas the second turbine 36 may be configured to achieve a necessary pressure and/or temperature of the medium to be provided to a load.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A water separator for use in an environmental control system of an aircraft comprising:

an outer housing having an upstream end, a downstream end, and a longitudinal axis; and a vane assembly arranged within the outer housing and spaced about the longitudinal axis, the vane assembly defining a plurality of flow channels, wherein at least one flow channel of the plurality of flow channels is located radially outward of another flow channel of the plurality of flow channels, wherein the plurality of flow channels have a spiral-like configuration about the longitudinal axis and a flow length of the plurality of flow channels is equal.

2. The water separator of claim 1, wherein each of the plurality of flow channels has a constant area over an axial length of the outer housing.

3. The water separator of claim 1, wherein a cross-sectional area of at least one of the plurality of flow channels varies relative to the cross-sectional area of another of the plurality of flow channels.

4. The water separator of claim 1, wherein a twist angle of at least one of the plurality of flow channels is different than the twist angle of another of the plurality of flow channels.

5. The water separator of claim 1, wherein the another flow channel has a first twist angle and the at least one flow channel located radially outward of the another flow channel has a second twist angle, the second twist angle being less than the first twist angle.

6. The water separator of claim 1, wherein the vane assembly includes at least one ring vane, the at least one ring vane extending parallel to the longitudinal axis.

7. The water separator of claim 6, wherein the at least one ring vane includes a plurality of ring vanes and an origin of each of the plurality of ring vanes is arranged at the longitudinal axis.

8. The water separator of claim 7, wherein the plurality of ring vanes are equidistantly spaced within the outer housing.

9. The water separator of claim 7, wherein the vane assembly includes at least one radial vane.

10. The water separator of claim 9, wherein the at least one radial vane is arranged between at least one pair of adjacent ring vanes of the plurality of ring vanes.

11. The water separator of claim 10, wherein the at least one radial vane is integrally formed with at least one of the plurality of ring vanes.

12. The water separator of claim 10, wherein a total number of radial vanes arranged between a first pair of adjacent ring vanes is equal to the total number of radial vanes arranged between a second pair of adjacent ring vanes.

13. The water separator of claim 10, wherein a total number of radial vanes arranged between a first pair of adjacent ring vanes is different from the total number of radial vanes arranged between a second pair of adjacent ring vanes.

14. The water separator of claim 9, further comprising a center body arranged within the outer housing and aligned with the longitudinal axis, wherein the at least one ring vane is arranged between the center body and the outer housing.

15. The water separator of claim 14, wherein at least one radial vane is arranged at the center body.

16. The water separator of claim 1, wherein a direction of twist of the spiral-like configuration about the longitudinal axis and a direction of a spin of a flow of medium provided to the upstream end of the outer housing is the same.

17. The water separator of claim 1, wherein a direction of twist of the spiral-like configuration about the longitudinal axis and a direction of a spin of a flow of medium provided to the upstream end of the outer housing is different.

18. The water separator of claim 1, further comprising a duct, the water separator being removably mounted within the duct.

19. The water separator of claim 1, further comprising a duct, the water separator being integrally formed with the duct.

* * * * *